(12) United States Patent
McCoy (10) Patent No.: US 10,248,697 B2
(45) Date of Patent: Apr. 2, 2019

(54) METHOD AND SYSTEM FOR FACILITATING INTERACTIVE REVIEW OF DATA

(75) Inventor: David F. McCoy, Garland, TX (US)

(73) Assignee: RAYTHEON COMPANY, Waltham, MA (US)

( * ) Notice: Subject to any disclaimer, the term of this patent is extended or adjusted under 35 U.S.C. 154(b) by 2106 days.

(21) Appl. No.: 12/508,925

(22) Filed: Jul. 24, 2009

(65) Prior Publication Data

US 2011/0022972 A1    Jan. 27, 2011

(51) Int. Cl.
*G06F 3/048*  (2013.01)
*G06F 17/30*  (2006.01)

(52) U.S. Cl.
CPC .... *G06F 17/3053* (2013.01); *G06F 17/30241* (2013.01)

(58) Field of Classification Search
CPC .. G06F 17/30247–17/30262; G06F 17/30277; G06F 17/30241; G06F 17/30061
USPC ................. 715/764; 348/143–160, 169–172; 707/736–757, 918–921, E17.018
See application file for complete search history.

(56) References Cited

U.S. PATENT DOCUMENTS

| | | | | |
|---|---|---|---|---|
| 5,576,950 A | * | 11/1996 | Tonomura | G11B 27/028 386/200 |
| 5,771,307 A | * | 6/1998 | Lu | G06K 9/00221 382/103 |
| 5,933,818 A | * | 8/1999 | Kasravi et al. | 706/12 |
| 7,444,003 B2 | * | 10/2008 | Laumeyer et al. | 382/103 |
| 7,595,816 B1 | * | 9/2009 | Enright | G06Q 20/18 348/143 |
| 8,027,513 B2 | * | 9/2011 | Leichter et al. | 382/103 |

(Continued)

FOREIGN PATENT DOCUMENTS

WO    WO 2008084220 A2 * 7/2008

OTHER PUBLICATIONS

BAE Systems, "SOCET GXP® eXtreme Analysis™ Electronics & Integrated Solutions," Brochure, BAE Systems National Security Solutions, Inc., socetgxp.sales@baesystems.com, 10 pages, © 2008.

(Continued)

*Primary Examiner* — Phuong Nguyen
(74) *Attorney, Agent, or Firm* — Daly, Crowley, Mofford & Durkee, LLP (57) ABSTRACT

A method for facilitating interactive review of data includes receiving multiple examples of a target associated with a set of data; comparing the examples of the target to the set of data to identify multiple potential matches; assigning, for each respective potential match, a priority value to the respective potential match based on a comparison of the examples of the target to the respective potential match; displaying the potential matches in a first display area, wherein the first display area organizes the potential matches according to the priority value assigned to each respective potential match; receiving a selection of at least one of the potential matches displayed in the first display area; and displaying, in response to the selection, the selected potential matches in a second display area, wherein the second display area organizes the selected potential matches according to a relationship between the selected potential matches.

18 Claims, 4 Drawing Sheets

(56) References Cited

U.S. PATENT DOCUMENTS

| | | | | |
|---|---|---|---|---|
| 8,310,554 | B2* | 11/2012 | Aggarwal et al. | 348/211.11 |
| 9,129,163 | B2* | 9/2015 | Chen | G06F 17/30247 |
| 2002/0090132 | A1* | 7/2002 | Boncyk | G06F 17/30256 382/154 |
| 2002/0107858 | A1* | 8/2002 | Lundahl et al. | 707/100 |
| 2002/0143769 | A1* | 10/2002 | Tecu et al. | 707/10 |
| 2003/0149679 | A1* | 8/2003 | Na et al. | 707/1 |
| 2003/0169919 | A1* | 9/2003 | Ikeda et al. | 382/159 |
| 2004/0130620 | A1* | 7/2004 | Buehler et al. | 348/143 |
| 2004/0208372 | A1* | 10/2004 | Boncyk | G06F 17/30256 382/181 |
| 2006/0221184 | A1* | 10/2006 | Vallone et al. | 348/155 |
| 2006/0221185 | A1* | 10/2006 | Miyamaki et al. | 348/159 |
| 2007/0219964 | A1* | 9/2007 | Cannon et al. | 707/3 |
| 2008/0260259 | A1* | 10/2008 | Paquette et al. | 382/203 |
| 2008/0313179 | A1* | 12/2008 | Trepess et al. | 707/5 |
| 2009/0059002 | A1* | 3/2009 | Kim | 348/143 |
| 2009/0066513 | A1* | 3/2009 | Kondo et al. | 340/572.1 |
| 2009/0141986 | A1* | 6/2009 | Boncyk | A61F 9/08 382/209 |
| 2010/0201815 | A1* | 8/2010 | Anderson et al. | 348/148 |
| 2010/0223218 | A1* | 9/2010 | Prendergast | 706/20 |
| 2010/0321504 | A1* | 12/2010 | Miyamaki et al. | 348/169 |

OTHER PUBLICATIONS

ENVI, "ENVI Tutorial: Basic Hyperspectral Analysis," White Paper, 10 pages, Undated.

ESRI, "ArcGIS™ Geostatistical Analyst: Statistical Tools for Data Exploration, Modeling, and Advanced Surface Generation," An ESRI® White Paper, info@esri.com, www.esri.com, 23 pages, Aug. 2001.

"ArcGIS™ Geostatistical Analyst," Statistical Tools and Models for data Exploration, Modeling, and Probabilistic Mapping, Brochure, ESRI, No. GS-35F-5086H, info@esri.com, www.esri.com, 7 pages, © 2005.

Charlton, M., et al., "Geographically Weighted Regression," White Paper, Science Foundation of Ireland, 14 pages, Mar. 3, 2009.

Krivoruchko, K., PhD, "Introduction to Modeling Spatial Processes Using Geostatistical Analyst," White Paper, ESRI Educational and Research Papers online at http://www.esri.com/software/arcgis/extensions/geostatistical/research_papers.htm., 27 pages, Undated.

Textron Systems, REMOTEVIEW™, Brochure, Overwatch Geospatial Textron Systems, www.geospatial.overwatch.com, 7 pages, Undated.

Itt, "ENVI. Get the Information You Need from Imagery," ITT Visual Information Solutions, www.ittvis.com, 6 pages, © 2009.

Erdas, ERDAS Field Guide™, ERDAS, Inc., 850 pages, Aug. 2009.

* cited by examiner

METHOD AND SYSTEM FOR FACILITATING INTERACTIVE REVIEW OF DATA

TECHNICAL FIELD OF THE INVENTION

The present invention relates generally to handling voluminous data, and, more particularly, to a method and system for facilitating interactive review of voluminous data.

BACKGROUND OF THE INVENTION

Modern technology has increased exponentially the volume of data available to be reviewed and analyzed in various contexts. For example, geospatial image data associated with satellite and/or flyover imaging may include thousands upon thousands of images covering a relatively modest geographic area, and this geographic area may be imaged multiple times a day. Analyzing voluminous data sets effectively and efficiently can be a significant challenge. Problems associated with various types of voluminous data sets may be compounded by the necessity to complete analyses of these data sets within a narrow time frame.

Traditionally, analysts would review geospatial image data using light tables, where an analyst would place film on a table, orient the film, adjust a light source beneath the film, and finally optically view and measure features on the film. Modern approaches to analyzing voluminous image data involve software simulations of the traditional light table. Both traditional light tables and software simulations of light tables, however, have proven to be inadequate in various respects.

SUMMARY OF THE INVENTION

In accordance with the present invention, techniques for facilitating interactive review of data are provided. According to some embodiments, these techniques can enable the review and analysis of voluminous data to identify targeted data quickly and efficiently.

According to a particular embodiment, a method for facilitating interactive review of data includes receiving a plurality of examples of a target associated with a set of data; comparing the plurality of examples of the target to the set of data to identify a plurality of potential matches; assigning, for each respective potential match, a priority value to the respective potential match based on a comparison of the plurality of examples of the target to the respective potential match; displaying the plurality of potential matches in a first display area, wherein the first display area organizes the plurality of potential matches according to the priority value assigned to each respective potential match; receiving a selection of at least one of the plurality of potential matches displayed in the first display area; and displaying, in response to the selection, the selected potential matches in a second display area, wherein the second display area organizes the selected potential matches according to a relationship between the selected potential matches.

Embodiments of the invention provide various technical advantages. For example, these techniques may facilitate interactive review of voluminous data. Furthermore, inefficiencies associated with previous methods and systems may be eliminated. For example, these techniques may provide for rapid data inspection by prioritizing and condensing information. Furthermore, these techniques may reduce the amount of data required to be manually inspected by an analyst and yet provide confidence that important data is not missed. More targets may be identified in a shorter amount of time. For example, analysts may quickly and efficiently identify, review, and analyze data that is not clearly relevant or clearly irrelevant. Thus, the speed of an automatic search for targeted data may be combined with the confidence of a manual review and analysis of the data. According to particular embodiments, analysts may be allowed to set target detection thresholds with confidence that targets of interest will not be missed while false positives will not be generated. Moreover, time may be saved and analyst fatigue may be reduced or eliminated while maintaining or improving results.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
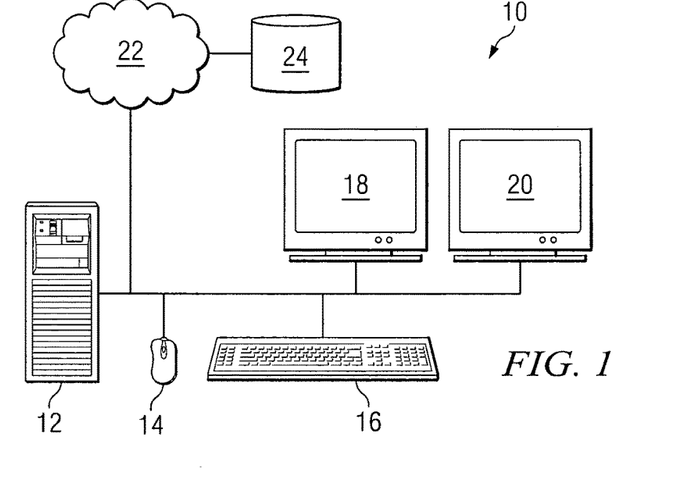
FIG. 1 illustrates a system for facilitating interactive review of data.

FIG. 1 illustrates a system, indicated generally at 10, for facilitating interactive review of data that includes a computer 12, a mouse 14, a keyboard 16, a first display area 18, a second display area 20, a network 22, and a database 24. The elements of system 10 can operate to facilitate interactive review of voluminous data. For example, an analyst using various components of system 10 may review voluminous amounts of data to identify targets quickly and efficiently using information displayed on first display area 18 and second display area 20.

Computer 12 represents any appropriate combination of hardware and/or software capable of processing information sent to or received from mouse 14, keyboard 16, first display area 18, second display area 20, network 22, and/or database 24. Computer 12 may be used in conjunction with one or more pieces of software. For example, computer 12 may be adapted to execute any of the well-known OS2, UNIX, MAC-OS, LINUX, and Windows operating systems, or other operating systems. Computer 12 may include one or more processors, random access memory (RAM), read only memory (ROM), input/output devices such as disk drives and/or universal serial bus (USB) ports, and may be coupled to one or more other input/output devices such as mouse 14, keyboard 16, first display area 18, and/or second display area 20. Computer programs may be stored in computer 12 on RAM, ROM, disk drives, and/or any other appropriate device such as database 24, and may be executed by a processor. Computer 12 may be coupled to network 22 and/or any appropriate telephone line, antenna, gateway, or any other type of communication link. Disk drives may include any of a variety of types of source media such as, for example, floppy disk drives, hard disk drives, CD-ROM drives, and/or magnetic tape drives. Computer 12 may be a general purpose desktop computer, general purpose laptop computer, or any of various other types of computers with or without conventional operating systems. Logic within computer 12 may be utilized to execute a method for facilitating interactive review of data. This logic may include computer executable software stored on a computer readable medium and loaded by computer 12. Any appropriate medium may be utilized to store the software. Moreover, the method may be implemented with computer software, computer hardware, or a combination of hardware and software.

Mouse 14 represents one example of an input/output device used to communicate with other elements of system 10. Keyboard 16 is another example of an input/output device used to communicate with other elements of system 10. While mouse 14 and keyboard are illustrated in system 10, system 10 may utilize any appropriate input/output devices. Thus for example, in a particular embodiment system 10 may include mouse 14 but not keyboard 16, keyboard 16 but not mouse 14, or other input/output devices but neither mouse 14 or keyboard 16.

First display area 18 and second display area 20 represent any appropriate combination of computer hardware and software for displaying information. For example, first display area 18 and second display area 20 may be liquid crystal displays (LCDs), cathode ray tube (CRT) monitors, or any other appropriate devices for displaying information. Moreover, while illustrated as two separate devices, first display area 18 and second display area 20 may be displayed on a single device, two devices, or more than two devices. Similarly, while system 10 includes two display areas, any appropriate number of display areas may be utilized, including one display area, two display areas, or more than two display areas. Thus, in particular embodiments, first display area 18 and second display area 20 may be located on the same display or monitor. In alternative embodiments, first display area 18 may be located on one display or monitor while second display area 20 may be located on a second display or monitor.

Network 22 represents communications equipment, including hardware, software, and any appropriate controlling logic, for interconnecting elements coupled to network 22. Thus, network 22 may represent a local area network (LAN), a wide area network (WAN), the Internet, and/or any other appropriate form of network. Network 22 may include any number of gateways, routers, and other communications equipment for use in communicating, for example, with computer 12 and database 24. Thus, as illustrated, network 22 may couple to computer 12 and database 24 to receive and transmit signals between computer 12 and database 24. Furthermore, network 22 may communicate information between any elements of system 10.

Database 24 represents any appropriate combination of hardware and/or software for storing data. For example, in a particular embodiment database 24 may store data for analysis by computer 12. Database 24 may also store information relating the data in database 24. For example, database 24 may store information identifying one or more relationships between data in database 24. Database 24 may also store results of analyses of data, computer programs for operation using the disclosed methods, and/or other information. While illustrated as a separate element of system 10, database 24 may be combined with any other element of system 10, such as computer 12. Thus, for example, database 24 and/or computer 12 may store data used in system 10.

In operation, computer 12 may access data stored in database 24 through network 22. Computer 12 may analyze the data in response to information received using mouse 14 and/or keyboard 16. Results of the analysis of the data by computer 12 may be displayed in first display area 18 and/or second display area 20. Moreover, first display area 18 and/or second display area 20 may be utilized to facilitate interactive review of the result of the analysis to identify and confirm targeted data.

According to a particular embodiment, a set of data and examples of a target may be obtained from a user of system 10 and stored in database 24. Computer 12 may execute computer software capable of comparing the data to examples of a target in order to identify potential matches. As used herein, a target may refer to targeted or desired data in any one or more of various forms, including but not limited to text and/or images. Furthermore, as used herein a match may refer to an approximate likeness or similarity between one or more examples of a target and data under review. Potential matches and/or representations of potential matches may be displayed in first display area 18 and/or second display area 20 to permit a user such as an analyst to review and analyze one or more potential matches. For example, an analyst may view a potential match in first display area 18 and/or second display area 20 to confirm that the potential match is indeed targeted data.

Potential matches may be prioritized by computer 12. One example of a prioritizing scheme may be the assignment of a priority value, such as a figure-of-merit (FOM), to each potential match. The data set may also be sorted by the priority value. Computer 12 may utilize first display area 18 to display potential matches organized by priority, such as by sorted FOM. First display area 18 may organize the potential matches by priority in various ways. For example, one portion of first display area 18 may display higher priority potential matches, while another portion displays lower priority potential matches. In the alternative or in addition, color coding may be used to identify relative priorities.

First display area 18 may display the potential matches themselves or representations of the potential matches. As used herein, displaying potential matches may involve displaying either the potential matches themselves or representations of the potential matches. By displaying representations of the potential matches, space may be saved. Moreover, by organizing display area 18 according to priority, a user of display area 18 may be able to detect borderline cases and/or to define priority thresholds for detections of the target.

In a particular embodiment, a user of system 10 may use mouse 14 and/or keyboard 16 to select a potential match shown in first display area 18. In response, computer 12 may display a selected potential match in second display area 20. The user may accept or reject potential matches from either display area using any appropriate method. For example, a selected potential match that includes the actual target may be accepted, while a selected potential match that does not include the actual target may be rejected. In particular embodiments, a user may select, accept, and/or reject individual potential matches using operations involving mouse 14 and/or keyboard 16. In the alternative or in addition, the user may utilize mouse 14 to draw rectangular regions or other polygon regions to select, accept, and/or reject groups of potential matches at the same time.

Second display area 20 may be used to display one or more selected potential matches while preserving a relationship between the selected potential matches. For example, the relative logical or spatial relationship between selected potential matches may be preserved by indicating the logical or spatial relationship in display area 20. In a particular embodiment, for example, the relative spatial position between selected potential matches may be preserved, but the distance between the selected potential matches may be reduced and the size of the selected potential matches may be increased. In this way, interesting data in the form of potential matches may be highlighted and uninteresting data between the potential matches may be eliminated. Stated similarly, the data may be condensed. This condensation of the data, alone or in combination with the preservation of the relationship between the potential matches, may increase analyst productivity and provide context for decision making.

Furthermore, by using a priority view such as first display area 18 and a condensed view such as second display area 20, an analyst may be able to identify borderline cases quickly and set detection thresholds with confidence that he or she will not miss targets of interest or generate many false positives. Thus, system 10 may be useful for data sets in which the number of data items becomes prohibitive for exhaustive human review, and a completely automatic classification cannot be fully trusted due to subjective factors or a high cost for errors. For example, the user may accept or reject targets based on the data or image displayed in the condensed view. After inspecting a few potential matches, some portion of the potential matches displayed in first display area 18 may be deemed reliable and may be accepted without manual review of each potential match. Likewise, some portion of the potential matches display in first display area 18 may be deemed unreliable and may be rejected without manual review of each potential match.

In a particular embodiment, system 10 may be utilized to facilitate interactive review of voluminous image data to identify targets. When the data comprises geospatial images, the target may be an image of a thing, such as a tank, a missile launch pad, or some other object that a person may wish to identify. When the data comprises other types of images, the target may be, for example, an image of a particular person's face, such as a known terrorist. Thus, a user may provide computer 12 with examples of targets in the form of images. Examples of the target may include pictures of the target taken in different light settings, from different perspectives, and/or with different backgrounds. Images of portions of desired targets may be provided. In the alternative or in addition, the examples may include desired and non-desired backgrounds. Examples may also include borderline cases as well as obvious cases of targets. Examples may be actual images, or images based on computer modeling and/or by using scale models.

Computer 12 may compare the image data with the examples of the targets provided by a user of system 10 to identify potential matches within the image data. To do so, computer 12 may calculate a filter using the examples of the target and/or the target's background. In particular embodiments, one or multiple filters may be used. For example, a separate filter may be used for the target and the target's background. Computer 12 may apply the filters to sort the data in database 24 and to assign priority values to the data and/or to potential matches. Thus, comparing one or more examples of a target to a data set and assigning priority values may involve applying one or more filters. In particular embodiments, database 24 may include thousands of images or more, and computer 12 may apply one or more filters to each image within database 24. Thus, computer 12 may identify potential matches in the image data.

While illustrated with respect to image data, the principles of the present disclosure are applicable to a broad range of data mining and review tasks, whether or not related specifically to images. For example, the disclosed concepts may be applied to searching department of defense records such as images from battlefronts or intercepted data transmissions. The disclosed concepts may also be applied to homeland security records and/or criminal records such as the contents of documents or images of people and/or fingerprints. Other applications may include searching and reviewing credit card data for fraudulent transactions and/or financial data for investment opportunities. Yet other examples of use might be analyzing astronomical survey data, including astronomical images. Another use may be in detecting disease using medical imaging. Thus, the data may be or include images, but it need not include images.

Figure 2:
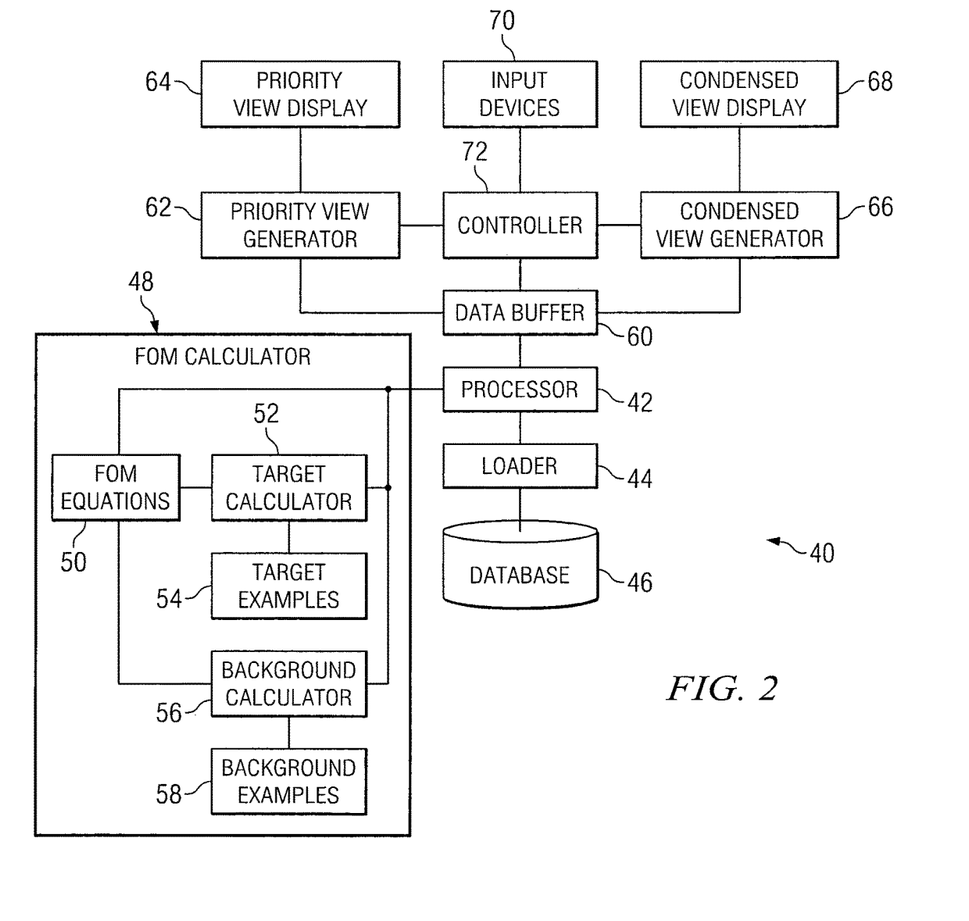
FIG. 2 is a schematic diagram illustrating components of a system for facilitating interactive review of data.

FIG. 2 is a schematic diagram 40 illustrating functional components of a system for facilitating interactive review of data. Schematic diagram 40 includes a processor 42 that loads data using loader 44 from database 46. As discussed, database 46 may store various types of data such as images, documents, spreadsheets, and/or any other type of information.

To analyze data stored in database 46, processor 42 utilizes FOM calculator 48. FOM calculator 48 represents any appropriate hardware and/or software for calculating priority values associated with data stored in database 46. For example, FOM calculator 48 may include FOM equations 50. FOM equations 50 may be any of various equations used to prioritize data stored in database 46. Various equations known to one of skill in the art may be utilized. Furthermore, FOM equations 50 may utilize target calculator 52 and background calculator 56. Target calculator 52 utilizes target examples 54, and background calculator 56 utilizes background examples 58. Note that while illustrated separately, FOM equations 50 may utilize one calculator regarding both the target and the background and/or one set of examples. Furthermore, FOM calculator 48 may overcome incomplete or inconsistent user understandings of the target by utilizing numerous examples. The number of examples may be increased using affine transform, contrast, brightness, and/or other modifications of known examples.

Various methodologies may be used to calculate priority values. One example is use of an FOM equation 50, such as FOM=T−B, where FOM is a priority value for a particular piece of data, T is a measure of similarity when comparing the piece of data to the target examples, and B is a measure of similarity to background examples. In a particular embodiment, a high correlation between a piece of data and examples of targets may be set to +1 and a low correlation between a piece of data and examples of targets may be set to 0, while a high correlation between a piece of data and examples of backgrounds may be −1 and a low correlation between a piece of data and examples of backgrounds may be set to 0. Thus, in this example, a maximum FOM may be 2. Using the disclosed practices, a first threshold FOM value may be identified such that the data under review that has an FOM value above the first threshold FOM value includes the sought after information. In the alternative or in addition, a second threshold FOM value may be identified such that the data under review that has an FOM value below the second threshold FOM value does not include the sought after information. Note that while target and background calculations may be combined, for example using the example equation FOM=T−B, target and background calculations may be separated.

In particular embodiments, FOM calculator 48 may utilize a least squares matched filter approach. When data stored in database 46 includes images, pixels in an image may be converted into a one dimensional array of numbers to facilitate operation of FOM calculator 48 using FOM equations 50. Thus, images in a data set under review and example images of targets may be represented by one dimensional arrays of numbers. In a particular embodiment, T may be calculated using the equation T=i*x and B may be calculated using the equation B=j*y, where i is a one dimensional array of image data associated with the data under review in the form of pixel values, j is a one dimensional array of image data associated background of the data under review in the form of pixels, and x and y are one-dimensional filters. Thus, as used herein, a comparison between data and examples of targets and backgrounds may involve use of filters. Furthermore, searching data to identify potential matches based on examples of targets and/or backgrounds may involve use of one or more filters.

An FOM filter, for example x used in the equations discussed above, may be calculated using equation A*x=b, where A is a two-dimensional array of example pixel values where the number of rows is equal to the number of examples and the number of columns is equal to the size of the image sub area the filter will cover in terms of pixels, x is the unknown one-dimensional filter, and b is a desired one-dimensional filter output for example cases. As discussed above, desired outputs may in particular embodiments be arrays of +1 and/or −1. Note that an extra element may be added to the variables to provide a constant offset to account for bias in the data. The example equation A*x=b may be solved for x, for example, using computer code. The resulting filter x may be tested to determine whether it performs as desired by evaluating E=b−A*x, where E is a one dimensional array showing an amount of error. Solving for E may show the amount the use of the filter differs from the desired output b. Note that image sub areas may be normalized, for example, by subtracting the mean and scaling by the standard deviation to partly normalize illumination variations. Thus, FOM calculator 48 derives a priority value, such as an FOM, using examples provided by a user. A similar equation can be used to solve for y, A*y=b.

FOM calculator 48 may take account for the effect of local context by taking statistical account of local backgrounds around the target to allow for cases in which a target has multiple backgrounds. In particular embodiments, multiple matched filters may be generated until each target can be separated from its background. Furthermore, FOM calculator 48 may take into account a distance from a location of interest. In the alternative or in addition, a user may also be able to adjust FOM calculations and weights interactively. Moreover, multiple filters may be applied and a linear combination of weights and filter outputs may be used to produce a single FOM priority number used to detect and rank potential matches.

While a particular example of FOM calculator 48 has been described, one of skill in the art may utilize any appropriate FOM calculator 48, using any appropriate equations, to prioritize potential matches in a data set.

When processor 42 completes analyzing data in database 46 using FOM calculator 48, the results may be transferred to data buffer 60 for use with priority view generator 62 and/or condensed view generator 66. Priority view generator 62 displays representations of the results stored in data buffer 60. The representations displayed in priority view generator 62 may organize the data according to the likelihood that the data includes the target. Thus, for example, priority view generator 62 may generate screenshots for display on priority view display 64.

Similarly, condensed view generator 66 generate screenshots for display on condensed view display 68. Condensed view generator 66 may display the data in its original format. For example, images of potential matches may be displayed by condensed view generator 66 on condensed view display 68. Condensed view generator 66 may preserve a relationship between the data displayed on condensed view display 68.

A user of the system illustrated by schematic diagram 40 may use input devices 70 to interact with controller 72 to control the information displayed on priority view display 64 and/or condensed view display 68. For example, a user may utilize mouse 14 and/or keyboard 16 to select a representation of a particular piece of data displayed in priority view display 64. In response, controller 72 may cause condensed view generator 66 to update condensed view display 68 to show the particular piece of data selected. Furthermore, when a user selects multiple pieces of data displayed in priority view display 64 using input devices 70, condensed view generator 66 may update condensed view display 68 to show each of the multiple pieces of data selected, while maintaining a relationship between the pieces of data. For example, in a particular embodiment, the data may be images, and the images displayed on a condensed view display 68 may be located on the condensed view display 68 to preserve approximate relative geospatial relationships between the images.

In a particular embodiment, priority view display 64 may organize representations of potential matches according to priority, and condensed view display 68 may enable a user to focus on high priority candidates. Using priority view 64 and condensed view display 68, an analyst may review only a fraction of the total data based on priority rating. Furthermore, using priority view 64 and condensed view display 68, an analyst may confirm whether potential matches include targeted data and therefore may be stored as confirmed or actual matches. Moreover, using priority view display 64 and condensed view display 68, the analyst may avoid wasting time and effort on uninteresting data, decreasing costs.

Figure 3A:
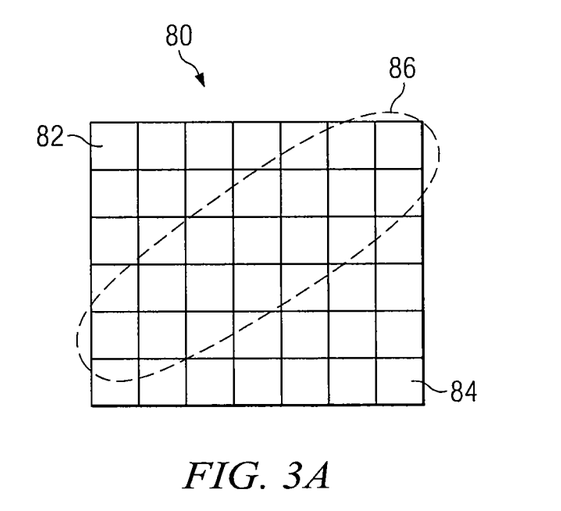
FIG. 3a illustrates a priority view display.

FIG. 3A illustrates a particular embodiment of a priority view display 80. As illustrated, priority view display 80 may be organized in a grid fashion, with representations of higher priority potential matches located closer to a high priority area 82 and representations of lower priority potential matches located closer to a low priority area 84. By organizing the relative location of potential matches on a display according to priority, priority view display 80 provides positional ranking of data. In the alternative or in addition, color coding may be utilized to identify priority ranking of data.

Figure 3B:
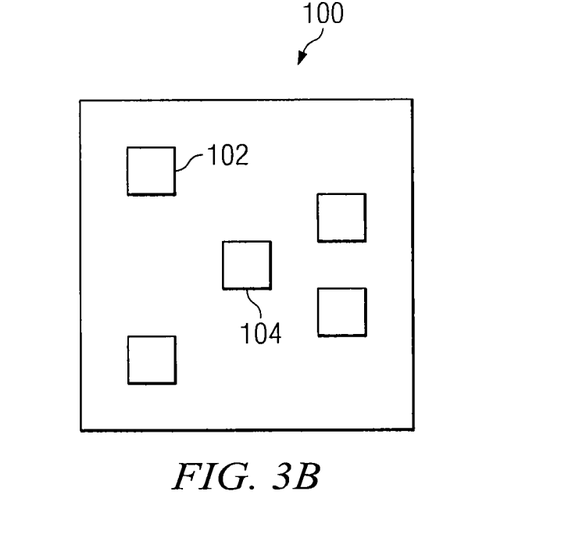
FIG. 3b illustrates a condensed view display.

By organizing representations of data according to priority, priority view display 80 may allow a user to identify more interesting data more easily. For example, a user of priority view display 80 may be able to identify representations of data having intermediate priority, for example those indicated by dotted line 86. Using an input device such as mouse 14, a user may select representations of data within dotted line 86 and manually review this data to determine whether a potential match should be accepted as an actual match. By manually reviewing this data, the user may quickly determine and specify one or more threshold levels for potential matches in the data. According to a particular embodiment, priority view display 80 may display representations of some but not all of the data under review, and in other embodiments priority view display 80 may include representations of all of the data under review. Furthermore, in a particular embodiment, a user may select a representation of data in priority view display 80, and the data associated with the representation may be displayed in a condensed view display 100.

Thus, priority view display 80 may display data ranked according to its priority value, for example FOM. Most interesting or desirable data may be sorted toward the upper left area of priority view display 80, while the least interesting or desirable data may be sorted towards the lower right area of priority view display 80. The most interesting or most desirable data may include data that obviously includes the actual target; the least interesting or least desirable data may include data that obviously does not include the actual target; and the data in the middle of priority view display 80 may indicate the potential for the presence of the actual target. A user, however, may select representations of potential matches in any portion of priority view display 80 for further evaluation. Furthermore, each data representation may be a single pixel or a small number of pixels to allow a user to work with voluminous data at a glance.

FIG. 3B illustrates condensed view display 100, which includes various potential matches including first potential match 102 and second potential match 104. Condensed view display 100 may show potential matches selected by a user using priority view display 80 to allow a user to review the underlying data. The data may be organized in condensed view display 100 to preserve an underlying relationship between the data. Thus, a user of condensed view display 100 may analyze potential matches that have the potential to be actual matches, while omitting uninteresting data, to focus on identifying which potential matches to identify as including the targeted data.

For example, when first potential match 102 and second potential match 104 are images, the relative geospatial relationship between the locations in which the images were taken or that the images depict may be preserved by locating the images in condensed view display 100 as they might be displayed on a map. A compass or another coordinate system may be included when first potential match 102 and second potential match 104 are images to allow the user to understand the relationship between the images and remain oriented. The images may also be enlarged such that the relative geospatial relationship may be preserved while the user is able to analyze the potential matches. Furthermore, in particular embodiments condensed view display 100 may utilize standard image viewing options, including, for example, rotation, scale, translation, brightness, and/or contrast adjustment. Thus, controls may be included to allow the user to pan and zoom on the images, to allow more background context around each potential match, and/or to allow more potential matches on the screen at the same time. Controls may be associated with short cut keys and/or mouse actions. In a particular embodiment, a user may or may not select a pull down menu or click a button on the screen to control priority view display 80 and/or condensed view display 100. Having reviewed the underlying data, a user of condensed view display 100 may confirm that a potential match is an actual match, or may reject the potential match as not being an actual match.

Various embodiments of the system and method disclosed herein may relate to the analysis of voluminous images. One embodiment may focus on analysis of astronomical imagery. For example, an FOM calculation may identify the similarity or difference between image data and typical stars or galaxies. Data displayed in condensed view display 100 may include images of selected areas. Coordinates used with such data may include right ascension and declination. Other embodiments may focus on medical imagery. For example, an FOM calculation may focus on similarities and/or differences between healthy tissue and unhealthy tissue. In a particular embodiment, medical images such as X-ray images may be compared to images of diseased tissue samples. Condensed view display 100 may show images of selected tissue. View coordinates may include patient up-down and right-left. Still other embodiments involving images may focus on imagery from battlefronts. In this context FOM calculations may focus on similarity of images to military vehicles and equipment. Images shown in condensed view display 100 may be images of potential military vehicles and equipment, and coordinates may include latitude and longitude.

As disclosed, however, the present disclosure may also be applied to various other applications whether or not images are used. For example, for homeland security purposes the FOM calculation may relate to similarity to pictures of known terrorists, to precursor activities, and/or to social networks frequented by terrorists. Thus, data viewed in condensed view display 100 may be a person's photo, data records, and/or pictures of associates. Coordinates used in condensed view display 100 may identify geographic locations, but may also or alternatively identify priority values. Another application may involve credit card fraud, and the FOM calculation may identify differences between current and historical transactions for a customer. Thus, data included in condensed view display 100 may include questionable transactions with historical background data for the same customer, and coordinates may include dollar values. Yet another application of the disclosed system and method may include stock screening. The associated FOM calculation may focus on return on equity, book value, dividends/yield, etc, and data displayed in condensed view display 100 may include key company statistics and/or average values for similar companies in the same industry. In this example, coordinates may include stock price versus FOM. Thus, in various embodiments, condensed view display 100 may preserve a logical relationship between potential matches. Furthermore, coordinates other than a compass may be used to indicate a relationship between data.

Figure 4:
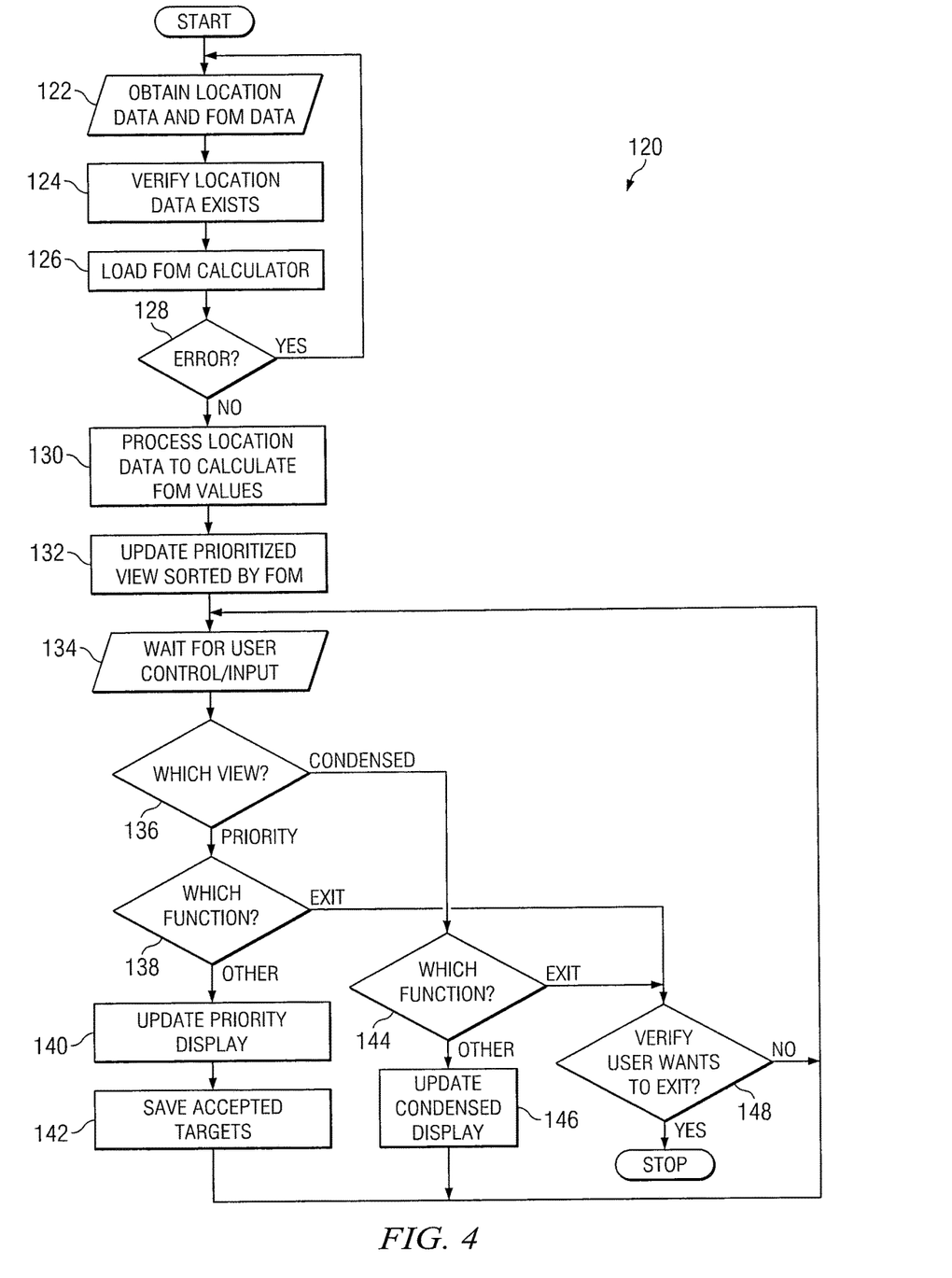
FIG. 4 is a flowchart illustrating a method for facilitating interactive review of data.

FIG. 4 is a flow chart illustrating an example of a method 120 for facilitating interactive review of data. At step 122, system 10 obtains location data and FOM data. For example, location data may include a set of images associated with a geographic location, and FOM data may include examples of a target the user wishes to identify in the location data. In a particular embodiment, a user may provide the examples in the form of multiple images of an actual target. System 10 verifies that the location data exists at step 124. In a particular embodiment, location data may be stored in a database such as database 24, and system 10 may determine whether desired location data is located in database 24.

At step 126, system 10 loads FOM calculator 48. For example, FOM equations 50, target calculator 52, target examples 54, background calculator 56, and background examples 58 may be loaded into memory. In a particular embodiment, a user may select an FOM calculation method. Furthermore, one or more filters may be derived by FOM calculator 48. At step 128, system 10 identifies whether an error has occurred. If an error has occurred, method 120 returns to step 122. If an error has not occurred, method 120 continues to step 130. At step 130, system 10 processes the location data to calculate FOM values for each piece of data in the location data. For example, the filter derived in step 126 may be applied to the data set to identify priority values for each piece of data. Processing may include comparing the location data to the examples of the targets to identify similarities and/or differences and/or to calculate priority values. System 10 updates priority view to include the location data sorted by the priority values, such as FOM, at step 132.

Note that in a particular embodiment, a user may also be able to select an option to set the priority value to a default value for any data that has a neighbor within a user defined radius that has a higher priority value. This option may prove to be particularly useful for image data, for example, to eliminate false positives and/or to reduce the amount of data to be reviewed by an analyst. For example, for vehicular targets, a user may identify a radius equal to a vehicle size. Since no two vehicles can occupy the same location, a best potential match may be selected out of several potential matches. Other potential matches may have their priority values reduced to eliminate redundancies and/or false positives.

At step 134, system 10 waits for user control or input. For example, a user may click on a priority view or a condensed view, or any of various functions or options associated with one of the views. When system 10 receives user control or input, at step 136 system 10 identifies which view is associated with the user control or input. If the view associated with the user control or input is the priority view display, at step 138 system 10 identifies which function the user selected. If the function the user selected is not exit, system 10 updates the priority view display in response to the function at step 140. For example, the user may select a representation of data from the priority view display to view in the condensed view display. As another example, a user may select representations of data in the priority view display and/or identify threshold priority values corresponding to categories such as 1) definitely a target; 2) cases requiring human review, and 3) definitely not targets. In a particular embodiment, a user may draw a polygon around representations of data in the priority view display to select a group of data that includes the actual target or that does not include the actual target. If the user has accepted targets, system 10 saves the accepted targets at step 142 before returning to step 134.

If the user control or input received at step 134 relates to the condensed view display, system 10 identifies the condensed view display at step 136 and proceeds to step 144. If the function associated with the condensed view display is not exit, at step 146 the condensed view display is updated to display any selected data before returning to step 134. In the condensed view, a user may be able to rotate, magnify, or pan images of data to inspect the data more closely. A user may select potential matches to review them more closely and to accept potential matches as actual targets.

Accepting potential matches as actual targets may involve removing the associated representation or data from the priority view display and/or the condensed view display. Thus, a user may utilize the priority view display and/or condensed view display to select and accept potential matches until no data remains for review. Removing representations, data, and/or images of data from the displays may not delete or destroy the original data, but may identify that the data has been reviewed by the user. Moreover, removing representations, data, and/or images of data from the displays may involve graying out the associated information on the displays. Moreover, a user may be able to save the result of his or her analysis for external reporting and/or additional processing.

When a user accepts or rejects a potential match from the condensed view display in particular, all instances of the potential match may be removed from one or both of the priority view display and the condensed view display since the user has indicated that he or she has seen and evaluated the underlying data. Removal of potential matches may provide a user with a sense of progress and maintain an understanding of the relative relationship of strong and weak detections. And as the user continues working, progressively fewer detections may remain in the priority view for the user to evaluate.

If in either view the user has selected exit, method 120 continues from step 138 or step 144 to step 148. At step 148, system 10 verifies whether the user wants to exit. If the user indicates that he or she does not want to exit, method 120 continues to step 134. If the user indicates that he or she does in fact want to exit, method 120 stops. Thus, method 120 represent one example of a method for facilitating interactive review of data.

Figure 5:
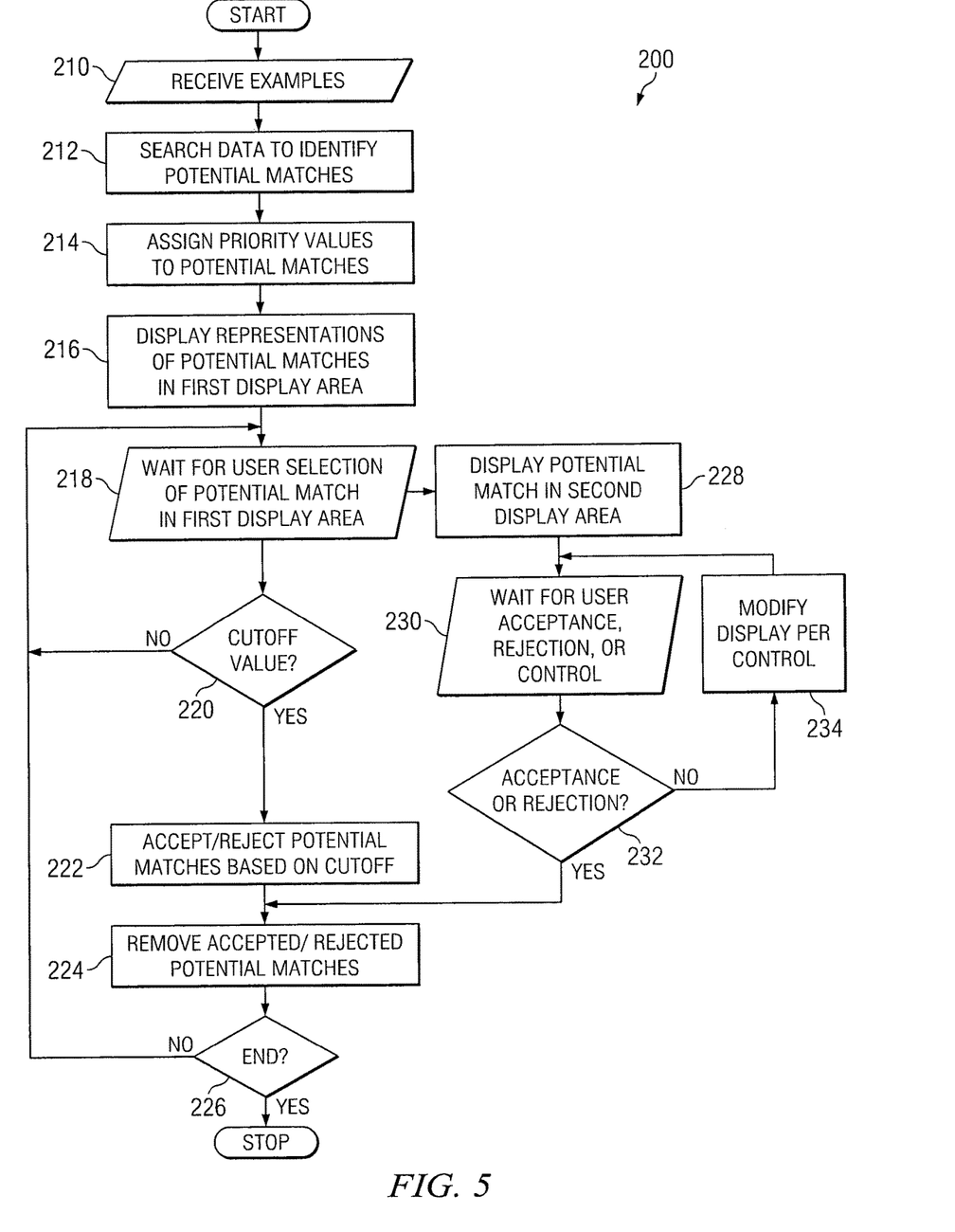
FIG. 5 is a flowchart illustrating a method for facilitating interactive review of data.

FIG. 5 is a flow chart illustrating another example of a method 200 for facilitating interactive review of data. At step 210, system 10 receives examples of a target associated with a set of data. System 10 searches a data set to identify potential matches based on the examples at step 212. For example, filters calculated using the examples of the target may be used to compare the examples to the data in the data set. At step 214, system 10 assigns priority values, such as FOM values, to potential matches in the data set, and at step 216 system 10 displays representations of potential matches in a first display area.

At step 218, system 10 waits for a user to select at least one potential match displayed in the first display area. When a user has selected a potential match, system 10 identifies whether the user has identified, or in the alternative or in addition whether system 10 has identified, a threshold value associated with the potential match at step 220. If a threshold value has not been identified, method 200 returns to step 218. If on the other hand a threshold value has been identified, system 10 accepts or rejects as appropriate potential matches based on the threshold value at step 222. At step 224, system 10 removes the accepted or rejected matches such as by changing the color of the accepted or rejected matches to indicate that those potential matches have been categorized. At step 226, system 10 identifies whether to end method 200. If method 200 continues, method 200 returns to step 218.

At step 228, system 10 displays potential matches in a second display area. For example, by permitting a user to review potential matches in the form of images, system 10 allows an analyst to attempt to identify whether a potential match actually includes targeted data. System 10 therefore allows the analyst to review and analyze the data. System 10 waits for user acceptance, rejection, or control at step 230. Method 200 determines whether the user has accepted or rejected a potential match at step 232. If the user has not accepted or rejected a potential match, system 10 modifies one or both of first display area or the second display area according to the user's control at step 234 before returning to step 230. If on the other hand the user has accepted or rejected a potential match, method 200 continues to step 224 to remove the accepted or rejected potential matches. Thus, method 200 represents a method for facilitating interactive review of data.

The preceding flowcharts illustrate particular methods for facilitating interactive review of data. However, these flowcharts illustrate only exemplary methods of operation, and system 10 contemplates devices using any suitable techniques, elements, and applications for performing these applications. Thus, many of the steps in the flowcharts may take place simultaneously and/or in different orders than as shown. In addition, the devices may use methods with additional steps or fewer steps, so long as the methods remain appropriate. Moreover, other devices of system 10 may perform similar techniques to facilitate interactive review of data.

Although the present invention has been described in several embodiments, a myriad of changes and modifications may be suggested to one skilled in the art, and it is intended that the present invention encompass such changes and modifications as fall within the present appended claims.

What is claimed is:

1. A method for facilitating interactive review of image data, comprising:
    receiving a plurality of examples of a target associated with a set of image data, wherein the image data comprises pixels;
    comparing the plurality of examples of the target to the set of image data to identify a plurality of potential matches based upon pixels of the target data and the pixels of the set of image data;
    assigning, for each respective potential match, a priority value to the respective potential match based on a comparison of the plurality of examples of the target to the respective potential match;
    displaying the plurality of potential matches in a first display area, wherein the first display area organizes the plurality of potential matches according to the priority value assigned to each respective potential match;
    receiving a selection of at least one of the plurality of potential matches displayed in the first display area; and displaying, in response to the selection, the selected potential matches in a second display area,
    wherein displaying the selected potential matches in the second display area comprises at least one of (i) enlarging the potential matches and displaying the potential matches in the second display area while maintaining a relative spatial relationship between the potential matches, or (ii) displaying any two of the potential matches at a second distance that is shorter than a first distance at which the two potential matches are displayed in the first display area, while maintaining a relative spatial relationship between the potential matches, and
    wherein displaying the selected potential matches in the second display area further comprises displaying an image for each selected potential match, receiving a command associated with modifying a display attribute associated with the images, and modifying, in response to the command, the display attribute associated with the images.

2. The method of claim 1, further comprising:
    receiving an acceptance of at least one of the selected potential matches; and
    removing, in response to the acceptance, the selected potential matches associated with the acceptance from the first display area and the second display area.

3. The method of claim 1, wherein displaying the plurality of potential matches in the first display area comprises displaying representations of the plurality of potential matches in a grid, wherein a first set of the representations in a first portion of the grid are associated with a first set of potential matches having priority values above a first threshold, and wherein a second set of the representations in a second portion of the grid are associated with a second set of potential matches having priority values below a second threshold.

4. The method of claim 1, further comprising:
    receiving acceptances of a first set of the plurality of potential matches;
    identifying a threshold priority value, wherein each of the plurality of potential matches in the first set has a priority value above the threshold priority value; and
    accepting a remaining set of the plurality of potential matches, wherein each of the plurality of potential matches in the remaining set also has a priority value above the threshold priority value.

5. The method of claim 1, further comprising:
    receiving a radius magnitude associated with the target;
    identifying a primary potential match having a priority value above a threshold;
    identifying secondary potential matches each having a priority value below the threshold and that are within the radius magnitude of the primary potential match;
    setting, in response to identifying the secondary potential matches, the priority values of the secondary potential matches to a default priority value; and
    removing the secondary potential matches from the first display area.

6. The method of claim 1, wherein the set of data comprises a set of images each associated with a location and wherein the relationship between the selected potential matches comprises a geographical relationship between the locations of the selected potential matches.

7. A system for facilitating interactive review of image data, comprising:
    an interface operable to receive a plurality of examples of a target associated with a set of image data, wherein the image data comprises pixels, and to receive a selection of at least one of a plurality of potential matches displayed in a first display area;
    a controller, comprising a computer processor, coupled to the interface and operable to compare the plurality of examples of the target to the set of image data to identify the plurality of potential matches, and to assign, for each respective potential match, a priority value to the respective potential match based on a comparison of pixels of the plurality of examples of the target to pixels of the respective potential match;
    the first display area operable to display the plurality of potential matches, wherein the first display area organizes the plurality of potential matches according to the priority value assigned to each respective potential match; and a second display area operable to display, in response to the selection, the selected potential matches,
    wherein displaying the selected potential matches by the second display area comprises at least one of (i) enlarging the potential matches and displaying the potential matches in the second display area while maintaining a relative spatial relationship between the potential matches, or (ii) displaying any two of the potential matches at a second distance that is shorter than a first distance at which the two potential matches are displayed in the first display area, while maintaining a relative spatial relationship between the potential matches, and wherein displaying the selected potential matches by the second display area further comprises displaying an image for each selected potential match, receiving a command associated with modifying a display attribute associated with the images, and modifying, in response to the command, the display attribute associated with the images.

8. The system of claim 7, wherein:
the interface is further operable to receive an acceptance of at least one of the selected potential matches; and
the controller is further operable to remove, in response to the acceptance, the selected potential matches associated with the acceptance from the first display area and the second display area.

9. The system of claim 7, wherein displaying the plurality of potential matches in the first display area comprises displaying representations of the plurality of potential matches in a grid, wherein a first set of the representations in a first portion of the grid are associated with a first set of potential matches having priority values above a first threshold, and wherein a second set of the representations in a second portion of the grid are associated with a second set of potential matches having priority values below a second threshold.

10. The system of claim 7, wherein:
the interface is further operable to receive acceptances of a first set of the plurality of potential matches;
the controller is further operable to identify a threshold priority value, wherein each of the plurality of potential matches in the first set has a priority value above the threshold priority value; and
the controller is further operable to accept a remaining set of the plurality of potential matches, wherein each of the plurality of potential matches in the remaining set also has a priority value above the threshold priority value.

11. The system of claim 7, wherein:
the interface is further operable to receive a radius magnitude associated with the target;
the controller is further operable to identify a primary potential match having a priority value above a threshold;
the controller is further operable to identify secondary potential matches each having a priority value below the threshold and that are within the radius magnitude of the primary potential match;
the controller is further operable to set, in response to identifying the secondary potential matches, the priority values of the secondary potential matches to a default priority value; and
the controller is further operable to remove the secondary potential matches from the first display area.

12. The system of claim 7, wherein the set of data comprises a set of images each associated with a location and wherein the relationship between the selected potential matches comprises a geographical relationship between the locations of the selected potential matches.

13. An article comprising stored instructions for facilitating interactive review of image data, the stored instructions encoded in non-transitory computer-readable media enabling machine to:
receive a plurality of examples of a target associated with a set of image data, wherein the image data comprises pixels;
compare the plurality of examples of the target to the set of image data to identify a plurality of potential matches based upon pixels of the target data and the pixels of the set of image data;
assign, for each respective potential match, a priority value to the respective potential match based on a comparison of the plurality of examples of the target to the respective potential match;
display the plurality of potential matches in a first display area, wherein the first display area organizes the plurality of potential matches according to the priority value assigned to each respective potential match;
receive a selection of at least one of the plurality of potential matches displayed in the first display area; and
display, in response to the selection, the selected potential matches in a second display area,
wherein displaying the selected potential matches in the second display area comprises at least one of (i) enlarging the potential matches and displaying the potential matches in the second display area while maintaining a relative spatial relationship between the potential matches, or (ii) displaying any two of the potential matches at a second distance that is shorter than a first distance at which the two potential matches are displayed in the first display area, while maintaining a relative spatial relationship between the potential matches, and
wherein displaying the selected potential matches in the second display area further comprises displaying an image for each selected potential match, receiving a command associated with modifying a display attribute associated with the images, and modifying, in response to the command, the display attribute associated with the images.

14. The article of claim 13, further operable when executed to:
receive an acceptance of at least one of the selected potential matches; and remove, in
response to the acceptance, the selected potential matches associated with the acceptance from the first display area and the second display area.

15. The article of claim 13, wherein displaying the plurality of potential matches in the first display area comprises displaying representations of the plurality of potential matches in a grid, wherein a first set of the representations in a first portion of the grid are associated with a first set of potential matches having priority values above a first threshold, and wherein a second set of the representations in a second portion of the grid are associated with a second set of potential matches having priority values below a second threshold.

16. The article of claim 13, further operable when executed to:
receive acceptances of a first set of the plurality of potential matches;
identify a threshold priority value, wherein each of the plurality of potential matches in the first set has a priority value above the threshold priority value; and
accept a remaining set of the plurality of potential matches, wherein each of the plurality of potential matches in the remaining set also has a priority value above the threshold priority value.

17. The article of claim 13, further operable when executed to:
receive a radius magnitude associated with the target;
identify a primary potential match having a priority value above a threshold;

identify secondary potential matches each having a priority value below the threshold and that are within the radius magnitude of the primary potential match;

set, in response to identifying the secondary potential matches, the priority values of the secondary potential matches to a default priority value; and remove the secondary potential matches from the first display area.

18. The article of claim 13, wherein the set of data comprises a set of images each associated with a location and wherein the relationship between the selected potential matches comprises a geographical relationship between the locations of the selected potential matches.

* * * * *